(12) United States Patent
Lang et al.

(10) Patent No.: US 9,845,248 B2
(45) Date of Patent: *Dec. 19, 2017

(54) PROCESS AND APPARATUS FOR PREPARATION OF OCTACHLOROTRISILANE

(71) Applicant: EVONIK DEGUSSA GmbH, Essen (DE)

(72) Inventors: Juergen Erwin Lang, Karlsruhe (DE); Hartwig Rauleder, Rheinfelden (DE); Ekkehard Mueh, Rheinfelden (DE); Imad Moussallem, Hanau (DE)

(73) Assignee: Evonik Degussa GmbH, Essen (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/782,545

(22) PCT Filed: Mar. 4, 2014

(86) PCT No.: PCT/EP2014/054127
§ 371 (c)(1),
(2) Date: Oct. 5, 2015

(87) PCT Pub. No.: WO2014/173574
PCT Pub. Date: Oct. 30, 2014

(65) Prior Publication Data
US 2016/0046494 A1    Feb. 18, 2016

(30) Foreign Application Priority Data
Apr. 24, 2013   (DE) .................. 10 2013 207 447

(51) Int. Cl.
*C01B 33/107* (2006.01)
*C01B 33/03* (2006.01)
*B01J 19/08* (2006.01)

(52) U.S. Cl.
CPC ........... *C01B 33/107* (2013.01); *B01J 19/087* (2013.01); *B01J 19/088* (2013.01); *C01B 33/03* (2013.01);
(Continued)

(58) Field of Classification Search
CPC ...... C01B 33/107; C01B 33/03; B01J 19/087; B01J 2219/0875; B01J 2219/0898
(Continued)

(56) References Cited

U.S. PATENT DOCUMENTS 4,321,246 A * 3/1982 Sarma .................. C01B 33/107
                                                            136/258
8,177,943 B2 * 5/2012 Auner .................... C08G 77/60
                                                            204/157.44
(Continued)

FOREIGN PATENT DOCUMENTS

CN    101193820 A    6/2008
CN    101298457 A    11/2008
(Continued)

OTHER PUBLICATIONS

W. Molnar, et al., "A General Approach toward Shape-Controlled Synthesis of Silicon Nanowires," Nano Letters, vol. 13, No. 1, XP055110798, Jan. 9, 2013, pp. 21-25.
(Continued)

*Primary Examiner* — Ngoc-Yen Nguyen
(74) *Attorney, Agent, or Firm* — Oblon, McClelland, Maier & Neustadt, L.L.P.

(57) ABSTRACT

The invention relates to a process and an apparatus for controlled preparation of octachlorotrisilane from monomeric chlorosilanes, by subjecting the chlorosilanes to a thermal plasma.

12 Claims, 6 Drawing Sheets

(52) U.S. Cl.
CPC . *C01B 33/10773* (2013.01); *B01J 2219/0875* (2013.01); *B01J 2219/0883* (2013.01); *B01J 2219/0898* (2013.01)

(58) Field of Classification Search
USPC .................................................. 423/341, 342
See application file for complete search history.

(56) References Cited

U.S. PATENT DOCUMENTS

| | | | |
|---|---|---|---|
| 2008/0197014 A1 | 8/2008 | Lang et al. | |
| 2009/0020413 A1 | 1/2009 | Popp et al. | |
| 2009/0127093 A1* | 5/2009 | Auner ................... | B01J 19/088 204/157.44 |
| 2009/0169457 A1* | 7/2009 | Auner ................... | C01B 33/027 423/342 |
| 2010/0080746 A1 | 4/2010 | Lang et al. | |
| 2010/0160591 A1* | 6/2010 | Tebakari ................ | C01B 33/03 528/10 |
| 2011/0150739 A1* | 6/2011 | Seliger .................. | C01B 33/03 423/341 |
| 2012/0195804 A1 | 8/2012 | Lang et al. | |
| 2013/0039830 A1 | 2/2013 | Auner et al. | |
| 2013/0043893 A1 | 2/2013 | Mueh et al. | |
| 2014/0017155 A1 | 1/2014 | Mueh et al. | |
| 2014/0178284 A1 | 6/2014 | Lang et al. | |

FOREIGN PATENT DOCUMENTS

| | | |
|---|---|---|
| CN | 102666381 A | 9/2012 |
| DE | 10 2005 041 137 A1 | 3/2007 |
| DE | 10 2007 007 874 A1 | 8/2008 |
| DE | 10 2010 043 646 A1 | 5/2012 |
| EP | 0 282 037 A2 | 9/1988 |
| JP | 60-247917 A | 12/1985 |
| JP | 2004-224591 A | 8/2004 |
| JP | 2010-18508 A | 1/2010 |
| JP | 4832511 B2 | 12/2011 |
| KR | 10-2009-0115725 A | 11/2009 |
| KR | 10-2001-0043545 A | 4/2011 |
| WO | 2006/013129 A1 | 2/2006 |
| WO | WO 2006/125425 A1 | 11/2006 |
| WO | 2011/103941 A1 | 9/2011 |
| WO | 2012/157871 A2 | 11/2012 |
| WO | 2012/157871 A3 | 11/2012 |
| WO | 2013/007426 A1 | 1/2013 |
| WO | 2014/173566 A1 | 10/2014 |
| WO | 2014/173567 A1 | 10/2014 |
| WO | 2014/173569 A1 | 10/2014 |
| WO | 2014/173573 A1 | 10/2014 |

OTHER PUBLICATIONS

Yu S. Ezhov, et al., "Molecular structure of octachlorotrisilane $Si_3Cl_8$," Journal of Structural Chemistry, vol. 49, No. 4, XP019609563, Sep. 14, 2008, pp. 606-612.
International Search Report dated Apr. 9, 2014 in PCT/EP2014/054127 filed Mar. 4, 2014.
Combined Chinese Office Action and Search Report dated Jun. 20, 2016 in Patent Application No. 201480023100.4 (with English language translation).
U.S. Appl. No. 14/782,247, filed Oct. 2, 2015, Lang et al.
U.S. Appl. No. 14/782,433, filed Oct. 5, 2015, Lang et al.
U.S. Appl. No. 14/782,099, filed Oct. 2, 2015, Lang et al.
U.S. Appl. No. 14/782,470, filed Oct. 5, 2015, Lang et al.
Combined Taiwanese Office Action and Search Report dated Jul. 4, 2016 in Patent Application No. 103114386 (with English language translation).
Office Action dated Jun. 22, 2017 in Korean Patent Application No. 10-2015-7030655 (with partial English language translation).

* cited by examiner

PROCESS AND APPARATUS FOR PREPARATION OF OCTACHLOROTRISILANE

The invention relates to a process and an apparatus for preparation of high- and ultrahigh-purity octachlorotrisilane from chlorosilanes, by subjecting monomeric chlorosilane to a thermal plasma.

The prior art discloses processes for preparing polychlorosilanes. For instance, DE 10 2006 034 061 discloses a reaction of silicon tetrachloride with hydrogen to prepare polysilanes. Because of the reaction in the presence of hydrogen, the polysilanes prepared contain hydrogen. In order to be able to keep the plant in continuous operation, tetrachlorosilane is added in excess in relation to the hydrogen. In addition, the plant disclosed has a complex structure and allows only the preparation of polysilane mixtures. An elevated molecular weight of the polysilanes can be achieved only through series connection of a plurality of reactors and high-frequency generators. After passing through each of the series-connected plasma reactors, there is an increase in the molecular weight of the polysilanes after each plasma reactor. The process disclosed is restricted to the preparation of compounds which can be converted to the gas phase without decomposition.

EP 1 264 798 A1 discloses a process for workup of by-products comprising hexachlorodisilane in the preparation of polycrystalline silicon.

U.S. Pat. No. 4,542,002 and WO 2009/143823 A2 also disclose plasmatic processes for preparation of polychlorosilanes proceeding from silicon tetrachloride and hydrogen. As a result of the preparation, hydrogen-containing polychlorosilanes are obtained. According to WO 2009/143823 A2, mixtures of hydrogen-containing high molecular weight polychlorosilanes are obtained. The silicon tetrachloride present in the polychlorosilanes has to be removed by distillation under reduced pressure in a costly and inconvenient manner prior to further use. A particular disadvantage in the prior art is the need to prepare the polychlorosilanes in the presence of gaseous hydrogen. As a result, very high safety demands are placed on the materials and the safeguarding of the plant.

The problem addressed by the present invention is that of providing an economically viable process for preparing octachlorotrisilane, especially high- to ultrahigh-purity octachlorotrisilane, which preferably need no longer be purified prior to further use, such as the deposition of silicon layers in semiconductor quality. In addition, the process is to feature a high yield and a particularly high purity of the process product. A further problem addressed was that of being able to dispense with the use of hydrogen. There was likewise to be no need to convert octachlorotrisilane to the gas phase in the course of direct preparation thereof, in order to reduce the formation of decomposition products. A further requirement was to prepare octachlorotrisilane essentially free from monomeric chlorosilanes directly in the course of preparation thereof. A further problem addressed was that of providing an inexpensive, simply constructed and easily operated plant for preparation of octachlorotrisilane. A particular focus lay on the minimization of the internal surface areas, which can contribute to the contamination of the chlorosilanes. In addition, the plant was to require little vertical space.

The stated problems are solved by a process according to claim 1, the octachlorotrisilane obtainable according to claim 15 and by the apparatus according to claim 14.

It has been found that, surprisingly, monomeric chlorosilanes, optionally in a mixture with hexachlorodisilane, can be converted in good yield in a thermal plasma, i.e. a plasma in thermal equilibrium, to octachlorotrisilane, and in accordance with the invention to high- to ultrahigh-purity octachlorotrisilane. The direct octachlorotrisilane process product may be present to an extent of greater than or equal to 85% by weight, and this is present in a mixture with polychlorosilanes having at least two silicon atoms 100% by weight. Useful polychlorosilanes are especially hexachlorodisilane, decachlorotetrasilane, dodecachloropentasilane and/or structural isomers thereof. It was particularly surprising that preparation of octachlorotrisilane from monomeric chlorosilanes such as preferably tetrachlorosilane, or mixtures comprising tetrachlorosilane (STC) and trichlorosilane (TCS) or mixtures of TCS, STC and/or dichlorosilane, is possible essentially without use of hydrogen gas in the thermal plasma. The particular economic advantage of the process according to the invention is achieved especially through the inventive apparatus comprising a gas discharge reactor arranged between two columns. Generally speaking, it is also possible by the process to prepare lower-quality octachlorotrisilane in a plant comprising a gas discharge reactor and a column arranged downstream.

The inventive apparatus comprises a plasma reactor, i.e. a gas discharge reactor, with two dedicated reactive distillation columns. Preferably, one of the columns and the gas discharge reactor have a dedicated recycle line for repassage of unconverted monomeric chlorosilanes of the general formula I through the gas discharge reactor, as shown in FIG. 3. The octachlorotrisilane prepared in accordance with the invention is preferably, for the purposes of the detection limit customary in the art, free of hydrogen atoms and/or monomeric chlorosilanes and/or polychlorosilanes containing hydrogen atoms.

The octachlorotrisilane is regarded as being free of hydrogen when its content of hydrogen atoms is below $1 \times 10^{-3}\%$ by weight, especially below $1 \times 10^{-4}\%$ by weight, further preferably below $1 \times 10^{-6}\%$ by weight down to the detection limit, which is currently $1 \times 10^{-10}\%$ by weight. The invention also provides an octachlorotrisilane having a content of hydrogen atoms of below $1 \times 10^{-3}\%$ by weight, preferably below $1 \times 10^{-6}\%$ by weight down to the aforementioned detection limit. The preferred method for determination of the content of hydrogen atoms is $^1$H NMR spectroscopy, CHN analysis, preferably in combination with ICP-MS for determination of the total contamination profile with the elements specified below.

A particularly great advantage of the process according to the invention is the direct use of the octachlorotrisilane prepared, i.e. without further purification, for deposition of high-purity silicon layers having solar silicon purity or even semiconductor quality.

The invention thus provides a process for preparing octachlorotrisilane, and octachlorotrisilane obtainable by this process, especially having a content of greater than or equal to 80% by weight of octachlorotrisilane and a titanium content less than or equal to 1 ppm by weight, preferably less than or equal to 100 ppb by weight, by subjecting chlorosilanes comprising at least one monomeric chlorosilane of the general formula I $$H_xSiCl_{4-x} \tag{I}$$

where x is independently selected from 0, 1, 2 and 3, x preferably being 0, 1 or 2, with x preferably being 0 or 1 and x more preferably being 0, or a mixture comprising at least two monomeric chlorosilanes of the formula I, especially selected from tetrachlorosilane, trichlorosilane and dichlorosilane, preferably pure tetrachlorosilane or pure tetrachlorosilane having a trichlorosilane content of less than or equal to 20% by weight in the overall mixture, especially less than or equal to 10% by weight, preferably less than or equal to 7.5% by weight, and optionally monomeric chlorosilanes in a mixture having a hexachlorodisilane content, to a thermal plasma and converting them to octachlorotrisilane.

The advantage of the process is that there is no need to use any hydrogen carrier gas or any additional catalyst. It is thus possible in the process to convert monomeric chlorosilanes of the general formula I or mixtures of monomeric chlorosilanes of the formula I with or without hexachlorodisilane in the thermal plasma to octachlorotrisilane, with no need to add any additional hydrogen-containing compounds, especially hydrogen.

The preferably high- to ultrahigh-purity octachlorotrisilane is prepared by means of conversion of monomeric chlorosilanes of the general formula I in a thermal plasma. Preferably, a return ratio of monomeric chlorosilanes of the general formula I and hexachlorodisilane, which are regarded as low boilers, is set at a gas divider. The recycled low boilers are then preferably condensed in a condenser and recycled into the first column or into the gas discharge reactor. The remaining portion of the low boilers can likewise be condensed and recycled or discharged. Preferably, monochlorosilane, HCl and/or monosilane obtained is not condensed and is discharged from the system downstream of the condenser.

Said separation is readily possible with the aid of appropriate temperature control in the condenser. In an alternative process regime, in the case of tetrachlorosilane as a reactant, optionally with a certain trichlorosilane and/or dichlorosilane content, the hexachlorodisilane formed is condensed in the condenser downstream of the gas divider and discharged, while the further chlorosilanes are fed back to the gas discharge reactor in gaseous form.

The possible reactions in the thermal plasma can be represented in idealized form as follows:

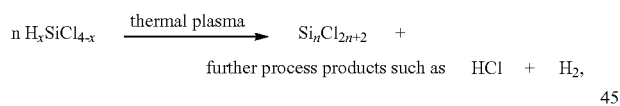

$$n\,H_xSiCl_{4-x} \xrightarrow{\text{thermal plasma}} Si_nCl_{2n+2} + \text{further process products such as } HCl + H_2,$$

where x=0, 1, 2 or 3, x preferably being 1 and 0, independently preferably n=3 and n=2 as intermediate.

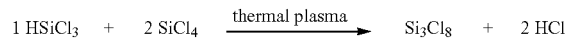

$$1\,HSiCl_3 + 2\,SiCl_4 \xrightarrow{\text{thermal plasma}} Si_3Cl_8 + 2\,HCl$$

Through the process regime, especially in the inventive apparatus of FIGS. 3 to 6, it is possible to selectively prepare and isolate octachlorotrisilane without having to convert it to the gas phase beforehand in order to separate it from monomeric reactants or by-products.

Preferably, the chlorosilanes of the general formula I used are tetrachlorosilane, trichlorosilane, dichlorosilane or mixtures of these. A particular advantage of the process is the possibility of preparation of octachlorotrisilane in semiconductor quality proceeding from ultrahigh-purity tetrachlorosilane ($STC_{eg}$), preferably in a mixture having a content of ultrahigh-purity trichlorosilane ($TCS_{eg}$).

Alternatively, it can be obtained from STC in the presence of ultrahigh-purity dichlorosilane ($DCS_{eg}$) and a mixture of the aforementioned chlorosilanes. A preferred mixture of correspondingly ultrahigh purity comprises tetrachlorosilane having a trichlorosilane and/or dichlorosilane content. "Ultrahigh-purity chlorosilane" in the context of the invention is the term for "electronics grade chlorosilane", abbreviated to "eg".

For preparation of the inventive octachlorotrisilane, a high- to ultrahigh-purity monomeric chlorosilane of the general formula I or a mixture of the monomeric chlorosilanes of the formula I is used, such as ultrahigh-purity tetrachlorosilane, ultrahigh-purity trichlorosilane and/or ultrahigh-purity dichlorosilane, preferably having a content of monomeric chlorosilanes of 90 to 99.9999999% by weight with 100% by weight of optionally hexachlorodisilane, octachlorotrisilane and optionally polychlorosilanes having at least two silicon atoms, where the total contamination with elements specified below of less than or equal to 100 ppm by weight to 0.001 ppt by weight defines a high-purity chlorosilane. A total contamination with the elements below of less than or equal to 50 ppm by weight to 0.001 ppt by weight defines an ultrahigh-purity chlorosilane, preference being given to less than or equal to 40 ppm by weight to 0.001 ppt by weight of total contamination. Preferably, the content of monomeric chlorosilanes is 98% by weight to 99.9999999% by weight with less than or equal to 100 ppm by weight to 0.001 ppt by weight of total contaminants in a high-purity chlorosilane, preferably less than or equal to 50 ppm by weight to 0.001 ppt by weight in an ultrahigh-purity chlorosilane, and optionally 100% by weight of hexachlorodisilane and/or octachlorotrisilane, where the impurity profile of the monomeric chlorosilanes of the general formula I is as follows:

a. aluminium from 15 ppm by weight to 0.0001 ppt by weight, and/or b. boron less than or equal to 5 to 0.0001 ppt by weight, preferably in the range from 3 ppm by weight to 0.0001 ppt by weight, and/or c. calcium less than or equal to 2 ppm by weight, preferably from 2 ppm by weight to 0.0001 ppt by weight, and/or d. iron from 5 ppm by weight to 0.0001 ppt by weight, preferably from 0.6 ppm by weight to 0.0001 ppt by weight, and/or e. nickel from 5 ppm by weight to 0.0001 ppt by weight, preferably from 0.5 ppm by weight to 0.0001 ppt by weight, and/or f. phosphorus from 5 ppm by weight to 0.0001 ppt by weight, preferably from 3 ppm by weight to 0.0001 ppt by weight, and/or g. titanium less than or equal to 10 ppm by weight, less than or equal to 2 ppm by weight, preferably from 1 ppm by weight to 0.0001 ppt by weight, further preferably from 0.6 ppm by weight to 0.0001 ppt by weight, further preferably from 0.1 ppm by weight to 0.0001 ppt by weight, and/or h. zinc less than or equal to 3 ppm by weight, preferably from 1 ppm by weight to 0.0001 ppt by weight, further preferably from 0.3 ppm by weight to 0.0001 ppt by weight, and/or i. carbon, where the target concentration of carbon is at a detection limit customary in the context of the measurement method known to those skilled in the art.

The total contamination with the aforementioned elements is preferably determined by means of ICP-MS. Overall, the process can be monitored continuously by means of online analysis. The required purity can be checked by means of GC, IR, NMR, ICP-MS, or by resistance measurement or GD-MS after deposition of the Si.

A particular advantage of the process according to the invention is that the preparation of octachlorotrisilane can be controlled selectively in the gas discharge reactor via the return ratio established, the molar content of hexachlorodisilane and the molar ratio of the monomeric chlorosilanes of the general formula I.

It is likewise advantageous that it is possible to dispense with the use of costly, inert noble gases. Alternatively, it is possible to add an entraining gas, preferably a pressurized inert gas, such as nitrogen, argon, another noble gas or mixtures thereof.

A further advantage of the process is the selective preparation of ultrahigh-purity octachlorotrisilane which may have a low content of ultrahigh-purity hexachlorodisilane, ultrahigh-purity decachlorotetrasilanes and/or dodecachioropentasilane and meets the demands of the semiconductor industry in an excellent manner.

Thus, in a particularly preferred process variant, ultrahigh-purity octachlorotrisilane having a content of octachlorotrisilane of greater than 95.9999% by weight to 99.999999% by weight is isolated, the remaining content up to 99.999999% by weight in each case comprising hexachlorodisilane, decachlorotetrasilane and/or dodecachioropentasilane. According to the invention, octachlorotrisilane can run through the first column into the reservoir vessel and be isolated continuously or batchwise therein.

In one alternative, it is additionally possible to isolate, as a low boiler, preferably downstream of the gas divider and after condensation, ultrahigh-purity hexachlorodisilane having a content of hexachlorodisilane of greater than 95.9999% by weight to 99.999999% by weight, the remaining content up to 99.999999% by weight in each case comprising monomeric chlorosilanes of the general formula I. Preferably, hexachlorodisilane can be isolated downstream of the condenser 11 according to FIGS. 5 and 6.

In a particularly preferred process variant, the direct process product isolated is an ultrahigh-purity octachlorotrisilane having a titanium content of below 10 ppm by weight, preferably of below 8 ppm by weight, more preferably below 5 ppm by weight, further preferably less than 1 ppm by weight (measured by means of ICP-MS).

High-purity octachlorotrisilane is regarded as being an octachlorotrisilane having a content of octachlorotrisilane between 80 and 99.999999% by weight with 100% by weight of polychlorosilanes, such as hexachlorodisilane, decachlorotetrasilane, dodecachloropentasilane and/or structural isomers thereof, where the total contamination with the elements below is less than or equal to 100 ppm by weight; in ultrahigh-purity octachlorotrisilane, the total contamination is less than or equal to 50 ppm by weight. Preferably, the octachlorotrisilane content in high-purity or ultrahigh-purity octachlorotrisilane is between 85 to 99.999999% by weight, preferably between 90 to 99.999999% by weight, more preferably between 99.99 to 99.9999999% by weight, further preferably between 99.9999 to 99.9999999% by weight, where the total contamination is less than or equal to 100 ppm by weight in high-purity and less than or equal to 50 ppm by weight in ultrahigh-purity octachlorotrisilane, especially with contamination by one, more than one or all the elements selected from boron, phosphorus, carbon and extraneous metals and hydrogen, preferably selected from boron, phosphorus, carbon, aluminium, calcium, iron, nickel, titanium and zinc and/or hydrogen.

This aforementioned octachlorotrisilane has the following contamination profile with one, more than one or all the following elements and is regarded as ultrahigh-purity octachlorotrisilane:
  a. aluminium less than or equal to 5 ppm by weight or from 5 ppm by weight to 0.0001 ppt by weight, preferably from 3 ppm by weight to 0.0001 ppt by weight, and/or
  b. boron from 10 ppm by weight to 0.0001 ppt by weight, preferably in the range from 5 to 0.0001 ppt by weight, further preferably in the range from 3 ppm by weight to 0.0001 ppt by weight, and/or
  c. calcium less than or equal to 2 ppm by weight, preferably from 2 ppm by weight to 0.0001 ppt by weight, and/or
  d. iron less than or equal to 20 ppm by weight, preferably from 10 ppm by weight to 0.0001 ppt by weight, further preferably from 0.6 ppm by weight to 0.0001 ppt by weight, and/or
  e. nickel less than or equal to 10 ppm by weight, preferably from 5 ppm by weight to 0.0001 ppt by weight, further preferably from 0.5 ppm by weight to 0.0001 ppt by weight, and/or
  f. phosphorus less than 10 ppm by weight to 0.0001 ppt by weight, preferably from 5 ppm by weight to 0.0001 ppt by weight, further preferably from 3 ppm by weight to 0.0001 ppt by weight, and/or
  g. titanium less than or equal to 10 ppm by weight, less than or equal to 2 ppm by weight, preferably from 1 ppm by weight to 0.0001 ppt by weight, further preferably from 0.6 ppm by weight to 0.0001 ppt by weight, further preferably from 0.1 ppm by weight to 0.0001 ppt by weight, and/or
  h. zinc less than or equal to 3 ppm by weight, preferably from 1 ppm by weight to 0.0001 ppt by weight, further preferably from 0.3 ppm by weight to 0.0001 ppt by weight,
  i. carbon, and
  j. hydrogen,
  where the target hydrogen and carbon contents are each in a concentration in the region of the detection limit of the measurement methods known to those skilled in the art.

As stated, total contamination of the octachlorotrisilane with the aforementioned elements or contaminants is from 100 ppm by weight to 0.001 ppt by weight in high-purity octachlorotrisilane, preferably from 50 ppm by weight to 0.001 ppt by weight in ultrahigh-purity octachlorotrisilane, further preferably from 10 ppm by weight to 0.001 ppt by weight, more preferably from 5 ppm by weight to 0.001 ppt by weight in total. The octachlorotrisilane obtainable in accordance with the invention has a concentration of hydrogen in the region of the detection limit of the measurement methods known to those skilled in the art.

More preferably, octachlorotrisilane is obtained, especially comprising hexachlorodisilane, decachlorotetrasilane and/or dodecachloropentasilane, where the octachlorotrisilane may have an octachlorotrisilane content of 60 to 99.999999% by weight, preferably in a mixture with other polychlorosilanes having 2, 4 and/or 5 silicon atoms. Preference is given to an octachlorotrisilane content of 91 to 99.999999% by weight, further preferably having a content of 99.99 to 99.9999999% by weight.

In a further-preferred process variant, the process according to the invention is used for preparation of octachlorotrisilane, by subjecting monomeric chlorosilane of the general formula I, especially tetrachlorosilane in a mixture with trichlorosilane or a mixture of monomeric chlorosilanes of the formula I in the presence of hexachlorodisilane, to a thermal plasma in an apparatus comprising a gas discharge reactor having two columns.

It is further preferable when monomeric chlorosilane of the formula I is supplied to a column for removal of octachlorotrisilane arranged upstream of the gas discharge reactor, or is introduced directly into the gas discharge reactor. The octachlorotrisilane removed is regarded as a high boiler. The ratio of the formation of octachlorotrisilane and hexachlorodisilane in the process according to the invention can be controlled via the molar ratio of the monomeric chlorosilanes of the formula I, the contact times in the gas discharge reactor and via the flow rate, measured in sccm/s.

In a particularly preferred embodiment, the process is performed in an apparatus having a first column having a column inlet for removal of the octachlorotrisilane upstream of the gas discharge reactor, especially below the gas discharge reactor, and a second column having a column inlet for removal of the low boilers, especially of the monomeric chlorosilanes and of hexachlorodisilane, downstream of and beyond, especially above, the gas discharge reactor. Preferably, this column outlet of the second column has a dedicated gas divider, and preferably downstream of the gas divider has at least one dedicated condenser for condensation of the low boilers recycled and/or removed. The apparatus may also be configured as a plasma reactive distillation apparatus, in which case the plasma reactor is arranged between two reactive distillation columns.

In the process, the chlorosilane of the formula I or chlorosilane of the formula I is introduced into the gas discharge reactor or supplied to the first column, especially in the upper third, in a mixture with hexachlorodisilane.

The invention likewise provides a process for preparing octachlorotrisilane in an apparatus as shown in FIGS. 3 to 6, comprising a first column 2a having a column inlet 3a for removal of octachlorotrisilane upstream of the gas discharge reactor 1, especially below the gas discharge reactor 1, and having a second column 2b having a column inlet 4a for removal of the low boilers, especially of monomeric and/or dimeric chlorosilanes, especially of the monomeric chlorosilanes formed, of unconverted reactants and of dimeric chlorosilane compounds such as hexachlorodisilane, downstream of and beyond the gas discharge reactor 1, especially above the gas discharge reactor 1 in accordance with FIGS. 3 to 5, and where the column outlet 4b of column 2b has a dedicated gas divider 5, the gas divider 5 more preferably having a shut-off or regulating unit, and the gas divider 5 further having a dedicated recycle line 6 which feeds the low boilers as a return stream to the first column 2a or the gas discharge reactor 1. In a particularly preferred embodiment, the gas divider 5 has a shut-off or regulating unit, preferably a valve, more preferably an electromagnetic valve. The electromagnetic valve may be configured as a disc valve.

The function of the gas divider 5 is to divide the gaseous process products and unconverted gaseous reactants into two gas streams, specifically into a first gas stream which is supplied via the recycle line 6 as a return stream back to the gas discharge reactor 1 or the first column 2a, especially in the upper half, preferably in the upper third. The second gas stream can be condensed, for example, in the arrangement 11 according to FIGS. 5 and 6 and be removed via the line 12, or supplied in a defined manner to the recycle line 6 via the shut-off and regulating unit 14. Alternatively, the condensed compounds of the second gas stream can also be supplied directly to the gas discharge reactor. The separated gas streams can independently be at least partly condensed using separate condensers downstream of the gas divider. The octachlorotrisilane formed runs off into the reservoir vessel or into the bottom draw in the first column 2a.

To determine preferred return ratios, an online process analysis technique, for example an IR analysis instrument and/or a process gas chromatograph, upstream of the gas divider can calculate the molar composition of the gas composition, from which the desired return ratio can subsequently be calculated with reference to the reactant streams. It is thus possible to control the molar composition of the reactants, especially in the continuous process, in order to be able to establish a defined molar ratio between the chlorosilanes of the general formula I and any hexachlorodisilane in the gas discharge reactor.

More preferably, the return ratio is set to a value which allows full recycling of hexachlorodisilane formed in the thermal plasma, allowing for the inaccuracy of measurement customary in the art, and preferably simultaneous establishment of a molar ratio of trichlorosilane to tetrachlorosilane of about 1 to 20 in the return stream. In a particularly preferred process variant, the hexachlorodisilane is condensed in the second gas stream, especially in the arrangement 11 comprising condenser 13 and regulating unit 14, as shown in FIG. 6, and in this way is separated from the gaseous monomeric chlorosilanes. The hexachlorodisilane can subsequently be supplied in a controlled manner via the regulating unit 14 to the recycle line 6. Alternatively, the hexachlorodisilane can be metered in via a further recycle line assigned to the first gas discharge reactor or the first column. It is likewise possible to add the hexachlorodisilane condensed out of the second gas stream directly to the reactant streams. The octachlorotrisilane formed in the thermal plasma can run out of the gas discharge reactor through the first column into the bottom draw or the reservoir vessel. The temperature of the reboiler is adjusted such that the desired octachlorotrisilane is not converted to the gas phase. The reboilers used may preferably be circulation evaporators for gentle heating of the polysilanes. Alternatively, it is also possible to continuously discharge bottom product, in order to minimize thermal stress.

The invention thus provides a process in which (i) the chlorosilanes of the formula I in a mixture with or without hexachlorodisilane leaving the gas discharge reactor via the second column (2b) are divided in the apparatus (0) at the gas divider (5) and (ii) a portion of the gas stream, also called first gas stream, is recycled as a return stream via the recycle line (6) into the first column (2a), (iii) this portion of the chlorosilane of the general formula I in a mixture with hexachlorodisilane and possibly hexachlorodisilane from the second gas stream can alternatively be regarded as the return stream and is conducted again through the gas discharge reactor (1) and (iv) octachlorotrisilane, especially high-purity octachlorotrisilane, more preferably ultrahigh-purity octachlorotrisilane, is obtained at the column outlet (3b) of the first column (2a).

Preferably, the chlorosilanes of the formula I in a mixture with hexachlorodisilane downstream of the gas divider can be at least partly condensed before being returned. The return stream is regarded as being the overall stream recycled, comprising the first gas stream but also the at least partly recycled second gas stream, especially the condensed hexachlorodisilane. It is particularly preferred when the molar ratio of trichlorosilane to tetrachlorosilane in the first gas stream, further preferably in the return stream, is from 0.1:20 to 2:20; more particularly, the molar ratio of trichlorosilane to tetrachlorosilane is set to about 1:20. The tolerance is about +/−0.5, preferably +/−0.25.

The octachlorotrisilane obtained can be purified further if required, for example distilled or purified by means of chromatography. However, further purification is generally unnecessary for octachlorotrisilane prepared in accordance with the invention. If required, the octachlorotrisilane obtained can be sent to a vacuum distillation, especially to a fine vacuum distillation, especially in order to increase the octachlorotrisilane content by removing the higher molecular weight polychlorosilanes if mixtures of polychlorosilanes have been obtained. Alternatively or additionally, a chromatographic workup may also follow, in order to remove impurities or else to adjust the octachlorotrisilane content.

Additionally or alternatively to one of the aforementioned features, preferably octachlorotrisilane having a content of polychlorosilanes comprising at least 1 mol % of branched polychlorosilanes in the overall composition, such as tert-decachlorotetrasilane, isodecachlorotetrasilane and/or branched dodecachloropentasilanes, is obtained, the proportion preferably being greater than or equal to 1.5 mol %.

Preference is further given to a process in which chlorosilane of the general formula I or a mixture of chlorosilanes of the formula I and possibly chlorosilane in a mixture with hexachlorodisilane is introduced into the gas discharge reactor or supplied to the first column, the chlorosilane or a mixture preferably being supplied in gaseous form to the gas discharge reactor or the first column. It is further preferable when the chlorosilane is evaporated when supplied for the first time; when returned as low boilers, the chlorosilane is evaporated in the first column, while octachlorotrisilane formed is not evaporated and can run off into the reservoir vessel at the bottom and be collected.

The monomeric and dimeric chlorosilanes, such as hexachlorodisilane, are regarded as low boilers, while octachlorotrisilane and polychlorosilanes having at least three silicon atoms are regarded as high boilers. In the process according to the invention, hydrogen, chlorine, monosilane, monochlorosilane and/or hydrogen chloride formed are discharged from the process as process gases and can subsequently be separated, condensed outside this apparatus or fed to another process.

The chlorosilanes of the formula I, especially tetrachlorosilane, trichlorosilane and/or dichlorosilane, leaving the gas discharge reactor, especially the plasmatron, via the second column correspond to chlorosilanes unconverted in the process, which are fed back to the gas discharge reactor as a return stream for conversion. The particular advantage of the process and the economic viability thereof arise from the recycling or circulation of the chlorosilanes unconverted in the gas discharge reactor.

The inventive recycling of unconverted chlorosilane reactants and the simultaneous discharge of the octachlorotrisilane via the first column as bottom products can, with the inventive apparatus or plant of simple construction, provide a particularly economically viable process with extremely reduced internal surface areas of the plant parts. Known processes and plants make a considerable contribution to the contamination of the products and the costs of the plant parts. Both the costs and the contamination were distinctly reduced by the process according to the invention and the apparatus according to the invention. Thus, the inventive construction of the plant in combination with the process according to the invention allows a particularly economically viable process regime with distinctly reduced contamination influences.

In an alternative process regime, the low boilers can be fed to the evaporator of the reactant feed or to the evaporator in the gas discharge reactor, such that the chlorosilanes and hexachlorodisilane are evaporated and the unevaporated octachlorotrisilane can run off in the first column.

Additionally or alternatively to one of the aforementioned process features, it is preferable when molar mixtures of monomeric chlorosilanes of the general formula I are used in the process or molar ratios are established in the thermal plasma. Preferred molar ratios of tetrachlorosilane and trichlorosilane are preferably from 1:30 to 10:1, especially from 1:25 to 5:1, further preferably from 1:20 to 1:10. Alternatively, for preparation of octachloretrisilane, it is possible with preference to use a mixture of chlorosilanes of the general formula I comprising tetrachlorosilane and dichlorosilane, especially in a molar ratio of 1:10 to 10:1, especially from 1:5 to 5:1, preferably from 1:2 to 2:1. In this way, it is possible by the process according to the invention, and especially using the inventive apparatus, to obtain a high-purity octachlorotrisilane, especially an ultrahigh-purity octachlorotrisilane, having in each case less than or equal to 1 ppm by weight of titanium.

According to the process, a preferred thermal plasma is an electrically generated equilibrium plasma. Thermal plasmas are regarded as being plasmas which are operated under elevated pressure and lead to an equilibrium. In a thermal plasma, the electrons $T_E$ and the ions $T_I$ have virtually the same temperature, since the free path length of the particles is low and the impact frequency is high, such that a homogeneous gas temperature $T_G$ is established, with $T_E$ approximately equal to $T_I$ approximately equal to $T_G$. A thermal plasma thus has high energy densities and high operating temperatures. The plasma is a light arc plasma and, according to the voltage applied, has a current flow between a few milliampere up to a few kiloampere. Preference is given to operating the process within the automatic discharge range, working within the glow discharge range (70 to 1000 V, 1 to 1000 mA), more preferably in the arc discharge range (10 to 50 V, greater than 1 A). The light arc plasma or the thermal plasma is generated with the aid of a plasmatron. Generally speaking, direct and indirect DC or AC plasmatrons are suitable for performance of the process according to the invention. In order to produce a preferred homogeneous thermal plasma, an indirect DC plasmatron is utilized.

In an indirect plasmatron, the monomeric chlorosilane of the general formula I flows around and through the light arc between cathode and anode within the plasmatron, and is likewise dissociated and ionized. In order to generate a stable light arc, preference is given to working with a DC plasmatron.

For performance of the process according to the invention, within the gas discharge reactor, the pressure is 300 to 800 $mbar_{abs}$.

The invention likewise provides an apparatus or a plant, especially for performance of the process according to the invention, wherein the apparatus 0 has a gas discharge reactor 1 having two dedicated columns 2a, 2b, and the gas discharge reactor is preferably a plasmatron (DC or AC), more preferably an indirect plasmatron. Further preferably, the apparatus has, in addition to the gas discharge reactor, a first column 2a with a column inlet 3a for removal of the octachlorotrisilane upstream of the gas discharge reactor 1 and a second column 2b with a column inlet 4a for removal of the low boilers and circulating hexachlorodisilane downstream of the gas discharge reactor 1. In addition, it is preferable when the column outlet 4b of the column 2b has a dedicated gas divider 5 to set defined gas flow rates of the low boilers.

For supply of the chlorosilanes to the gas discharge reactor, the reactor has a dedicated reactant feed 9, FIG. 4 or 5, which, in an alternative, has an evaporator 10, FIG. 4 or 5, for evaporation and/or temperature control of the reactants. Alternatively, the evaporator may also be within the gas discharge reactor 1.

In a particularly preferred embodiment, the gas divider 5 has a dedicated shut-off or regulating unit, especially a valve, the gas divider 5 more preferably having a dedicated electromagnetic valve, and a dedicated recycle line 6 which supplies the low boilers to the first column 2a or to the gas discharge reactor 1, an evaporator in the gas discharge reactor or an evaporator dedicated to the reactant feed. The lower column outlet 3b of the first column 2a has a dedicated reservoir vessel 7 at the bottom draw or reboiler 8. According to the invention, what are called packed columns or reactive columns, which may have Raschig rings or bubble-cap trays, are used as the first and/or second columns. The octachlorotrisilane prepared is isolated in high purity or ultrahigh purity in a reservoir vessel 7 dedicated to the column outlet 3b of the first column or a reboiler 8 dedicated to the column outlet 3b. As shown in FIGS. 5 and 6, the gas divider 5 has a dedicated arrangement 11 having a condenser 13 for condensation of at least a portion of the second gas stream, especially of hexachlorodisilane. The recycle line 6 is likewise assigned to the gas divider 5 and to the arrangement 11. Overall, the low boilers from the second column can be divided at the gas divider 5 into a first gas stream which is passed into the recycle line 6, and into a second gas stream which can be run into the arrangement 11 and past the condenser 13.

The second gas stream can subsequently be passed from the arrangement 11 through the regulating unit 14 to the recycle line 6 or be discharged via line 12.

The invention likewise provides an octachlorotrisilane obtainable by the process according to the invention, which has an octachlorotrisilane content of 90.0 to 99.999999% by weight with 100% by weight of preferably polychlorosilanes having at least three silicon atoms, more preferably with 100% by weight of hexachlorodisilane, n-decachlorotetrasilane, isodecachlorotetrasilane, tert-decachlorotetrasilane and/or dodecachloropentasilane and structural isomers thereof, and having a content of titanium of less than or equal to 1 ppm by weight. The octachlorotrisilane obtained may additionally or alternatively have a content of branched polychlorosilanes having at least four silicon atoms of greater than or equal to 1 mol % in the overall composition.

The octachlorotrisilane prepared by the process, having a titanium content of less than or equal to 1 ppm by weight, is outstandingly suitable for deposition of high- to ultrahigh-purity silicon, preferably of silicon-containing layers. The use of the pure octachlorotrisilane produced in accordance with the invention allows a distinct reduction both in the chlorine loading during the deposition and in the temperatures during the deposition. The octachlorotrisilane is likewise highly suitable for preparation of silicon nitride, silicon oxynitride, silicon carbide, silicon oxycarbide or silicon oxide, especially for production of layers of these materials and for production of epitaxial layers, preferably by low-temperature epitaxy. These layers can be produced, for example, by chemical vapour deposition (CVD). In addition, the high-purity or ultrahigh-purity octachlorotrisilane prepared is suitable as a starting substance for the preparation of high-purity disilane ($Si_2H_6$) or trisilane ($Si_3H_8$).

The invention is illustrated in detail hereinafter by the figures.

EXAMPLE 1

Preparation of Mixture of Octachlorotrisilane and Hexachlorodisilane

Figure 1:
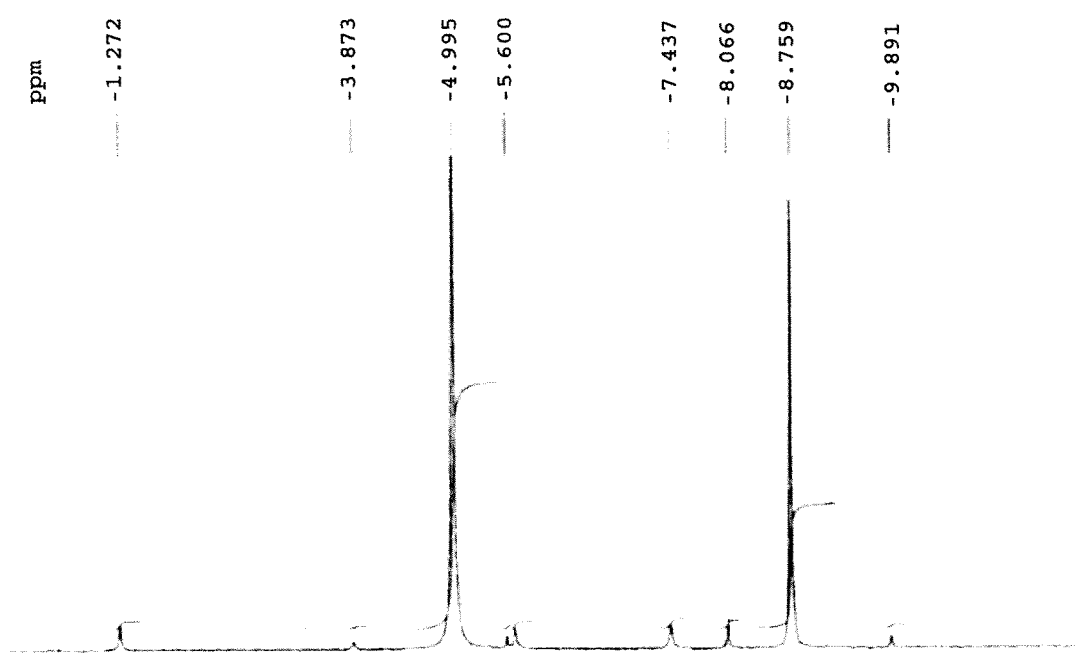
FIG. 1: Mixture comprising octachlorotrisilane and hexachlorodisilane prepared by the process according to the invention, 99.34 MHz $^{29}$Si NMR in DMSO.

The concentrations of the contaminants in the mixture obtained in accordance with the invention, measured in the $^{29}$Si NMR, are shown in FIG. 1.

EXAMPLE 2

Preparation of Mixture of Polychlorosilanes

Figure 2:
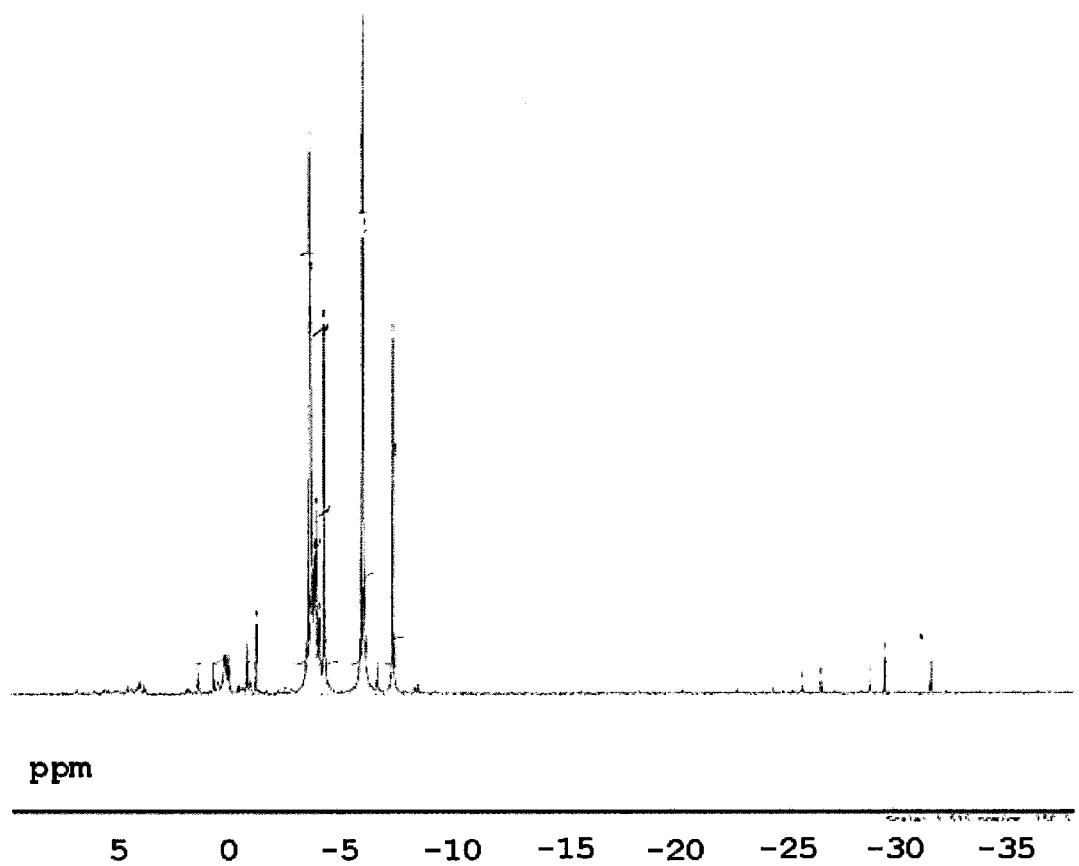
FIG. 2: Polychlorosilanes comprising hexachlorodisilane, octachlorotrisilane, tert-decachlorotetrasilane, n-decachlorotetrasilane and dodecachloropentasilane prepared by the process according to the invention, 99.34 MHz $^{29}$Si NMR in DMSO. A=$Si_2Cl_6$, B=n-$Si_3Cl_8$, C=$(Cl_3Si)_3SiCl$, D=n-$Si_4Cl_{10}$ and E=n-$SiCl_{12}$.
Figure 3:
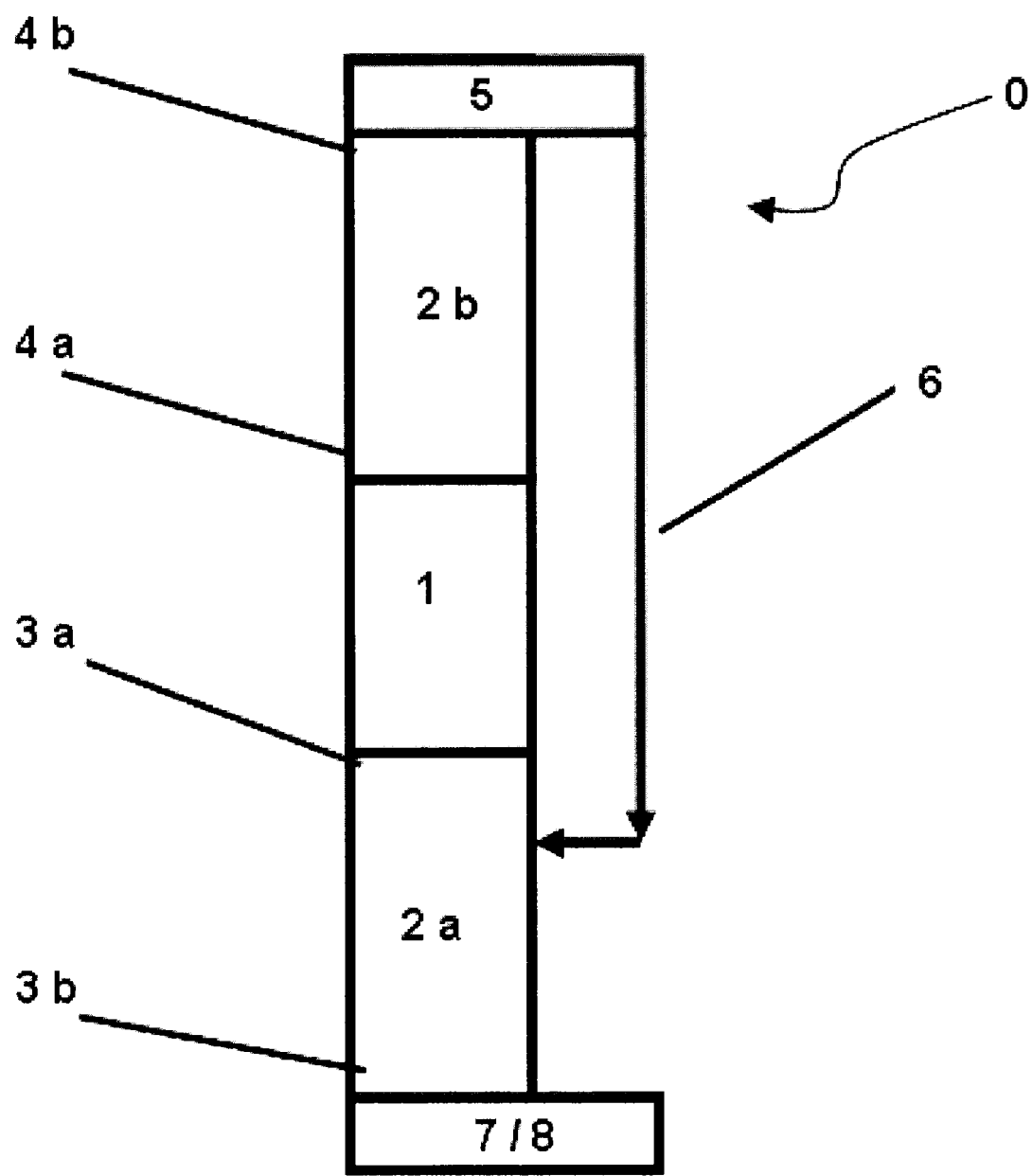
FIG. 3: Schematic diagram of the apparatus 0 comprising a gas discharge reactor 1 and a first column 2a and a second column 2b, and also a gas divider 5 and a recycle line 6.
Figure 4:
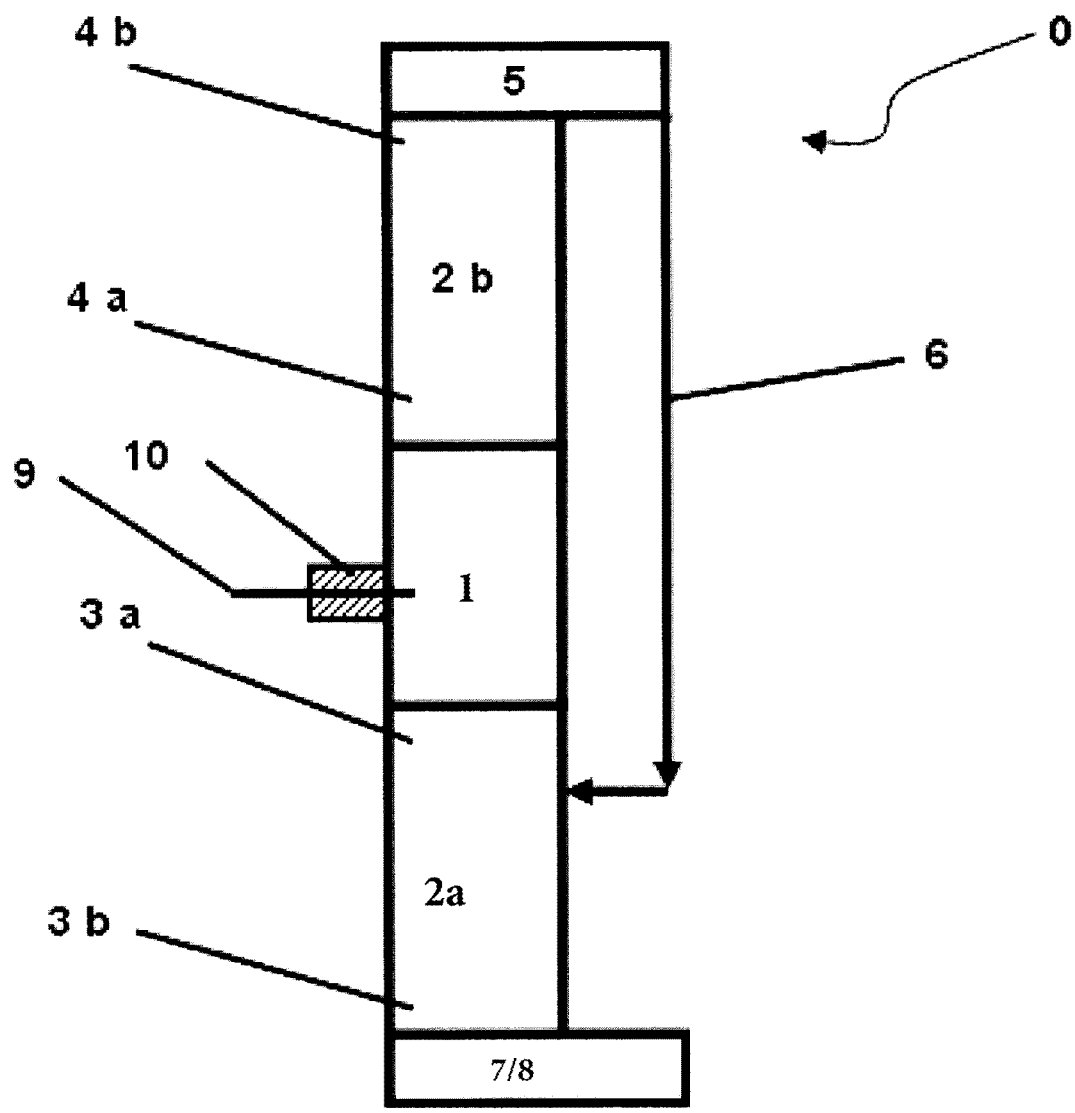
FIG. 4: Schematic diagram of the apparatus 0 with reboiler 8 and reactant feed 9, and also evaporator 10.
Figure 5:
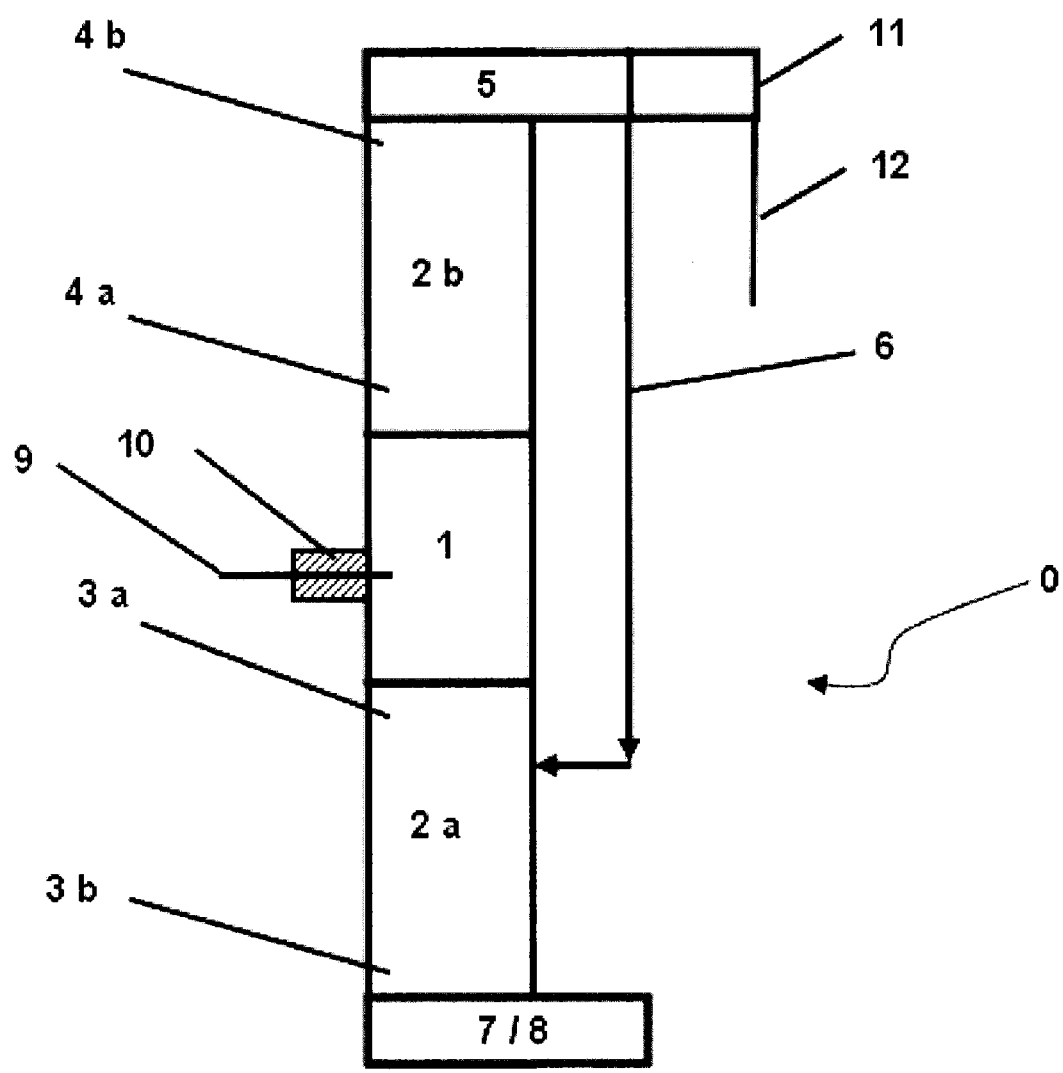
FIG. 5: Schematic diagram of the apparatus 0 with reboiler 8, reactant feed 9, gas divider 5 and arrangement 11 comprising a condenser 13.
Figure 6:
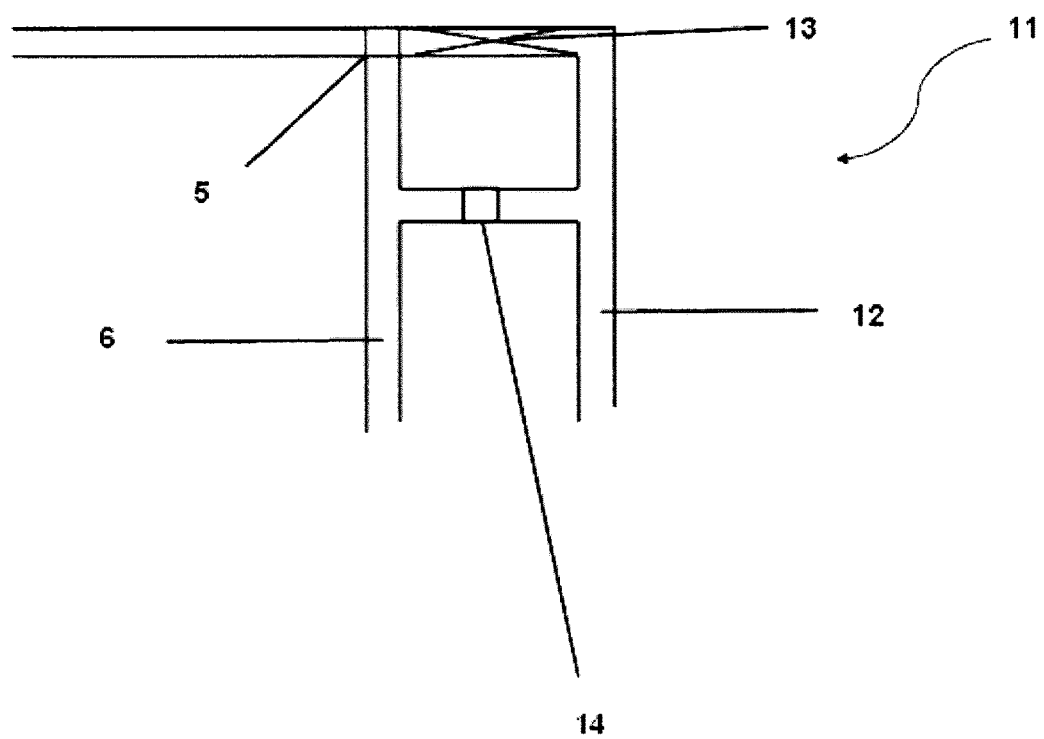
FIG. 6: Schematic diagram of the arrangement 11 and gas divider 5

The content of extraneous metals was measured by ICP-MS. The contaminants of the mixture obtained in accordance with the invention are shown in FIG. 2.

LIST OF REFERENCE NUMERALS 0 apparatus/plant
1 gas discharge reactor
2a first column
2b second column
3a upper column outlet of the first column
3b lower column outlet of the first column
4a lower column outlet of the second column
4b upper column outlet of the second column
5 condenser
6 recycle line
7 reservoir vessel
8 reboiler
9 reactant feed
10 evaporator
11 arrangement comprising condenser and regulating unit (return/removal)
12 line
13 condenser
14 shut-off/regulating unit

The invention claimed is:
1. A process for preparing octachlorotrisilane, the process comprising subjecting chlorosilanes comprising at least one monomeric chlorosilane of formula I in the absence of hydrogen to a thermal plasma:

$$H_xSiCl_{4-x} \quad (I),$$

where x is independently selected from 0, 1, 2 and 3.

2. The process according to claim 1, further comprising obtaining a mixture of octachlorotrisilane and hexachlorodisilane.

3. The process according to claim 1, further comprising isolating ultrahigh-purity octachlorotrisilane.

4. The process according to claim 1, further comprising obtaining octachlorotrisilane having a titanium content of less than 1 ppm by weight.

5. The process according to claim 1, wherein the the chlorosilanes are one or more of an ultrahigh-purity tetrachlorosilane, an ultrahigh-purity trichlorosilane, and an ultrahigh-purity dichlorosilane.

6. The process according to claim 1, wherein the process is performed in an apparatus comprising a gas discharge reactor, a first column, and a second column.

7. The process according to claim 6, wherein
the first column is provided with a column inlet for removal of octachlorotrisilane upstream of the gas discharge reactor and the second column is provided with a column inlet for removal of low boilers downstream of the gas discharge reactor and a column outlet, the column outlet of the second colunm has a dedicated gas divider, and
the gas divider has a dedicated recycle line which supplies the low boilers to the first column or to the gas discharge reactor as a return stream.

8. The process according to claim 7, wherein the gas divider has a shut-off, a valve, or other regulating unit.

9. The process according to claim 7, wherein the chlorosilane of the formula I is introduced into the gas discharge reactor or supplied to the first column in a mixture with hexachlorodisilane.

10. The process according to claim 9, wherein
unconverted mixture of the chlorosilanes of the formula I and hexachlorodisilane leaving the gas discharge reactor via the second column are divided in the apparatus at the gas divider,
a portion of the mixture is recycled as a return stream via the recyle line into the first column and conducted again through the gas discharge reactor, and
high-purity or ultrahigh-purity octachlorotrisilane is obtained at the column outlet of the first column.

11. The process according to claim 10, wherein a molar ratio of trichlorosilane to tetrachlorosilane in the return stream is from 0.1:20 to 2:20.

12. The process according to claim 6, wherein a pressure of 300 to 800 $mbar_{abs}$ exists in the gas discharge reactor.

* * * * *